United States Patent Office 3,004,776
Patented Oct. 17, 1961

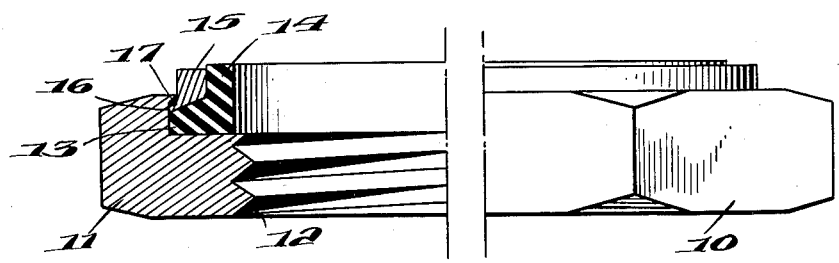
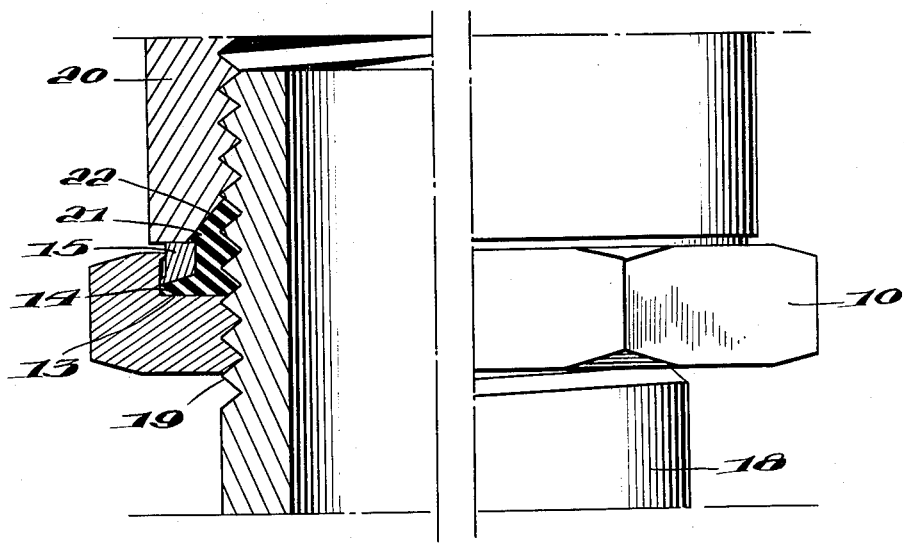
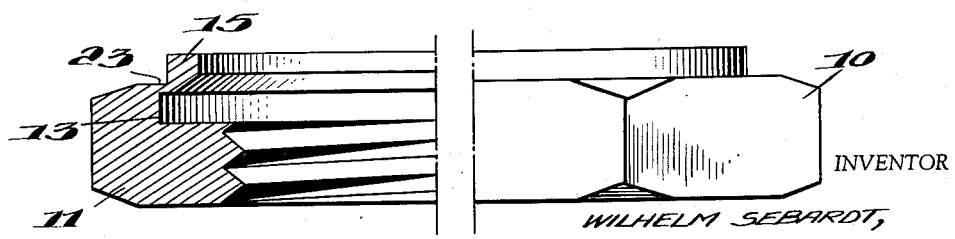

3,004,776
PIPE COUPLING HAVING A SEALING NUT WITH A FRANGIBLE SECTION
Wilhelm Sebardt, Rattviksvagen 18, Bromma, Sweden
Filed Dec. 12, 1958, Ser. No. 780,074
1 Claim. (Cl. 285—3)

This invention relates to a sealing nut which is adapted to insure a leak-proof fitting between threaded connections. The present invention is a continuation in part of my copending application Serial No. 660,375, filed May 20, 1957, now abandoned.

When tightening pipe-connections it is customary to use a nut provided with a conical groove and to put in this nut a thread of flax. Sealing will be obtained when the nut is moved against a ring which is provided with a corresponding control groove. In order to tighten other pipe parts with this device it is necessary to provide those with an exactly modelled groove which not always is easy to effect. However, the degree of sealing obtained is not sufficient for all purposes. With such devices it is not possible to provide leak-proof connections where high pressures or fluid hydrocarbons are utilized. In order to obtain a more effective sealing of thread connections a number of different constructions have been proposed. Those constructions, however, have either been too complicated, and thus too expensive in production, or they consisted of several specially manufactured parts which must be positioned in a certain manner, and, therefore were not readily adaptable to a number of different uses. Other constructions required subsequent treatment of the standardized pipe parts which is not practical.

In prior art literature there is described a type of nut intended to be used as a stop nut. These nuts are provided with a surrounding case in which is placed an elastic material which will be pressed into the thread and thus lock up the nut when it is moved against a stop. Naturally a certain sealing effect can be obtained when using such a nut as a stop nut. The sealing effect is, however, owing to the performance of the nut, insufficiently, because the case which surrounds the nut and the elastic material therein is exposed to the whole sealing pressure, and thus, it will dilate if not made sufficiently strong. Thereby the sealing effect is reduced. If the case is made sufficiently strong so that it can withstand the sealing pressure the sealing nut becomes too heavy and also too expensive in production for any practical use. Another disadvantage of the nut mentioned is that the case has to move around the nut a substantial distance before any considerable compression of the elastic material is obtained. With a sealing nut according to the present invention the above mentioned disadvantages are eliminated and sealing is obtained even under extremely high pressures, or when using fluid hydrocarbons.

A sealing nut according to the present invention has the following advantages:

(1) Sealing may be obtained when used with all pressure media, even under high pressure;

(2) The device may be used with all pipe parts commonly used today without any modification thereof;

(3) The device is comparatively small and of simple construction;

(4) The device requires no special tools and may be readily applied without difficulty.

A sealing nut according to the invention comprises a nut provided with an internal thread, a sealing ring of a material which is resilient and a movable press ring which co-operates with the sealing ring. According to the invention one end of the nut is provided with a groove concentric with the thread, which together with the press ring encircles the sealing ring. The essence of the invention resides in constructing the sealing ring and press ring so that, when the nut is moved along a threaded pipe end towards a connecting part, the press ring forces the sealing ring into engagement with the end face of the connecting part and into the threads of the pipe end. Thus the sealing ring provides means for tightly sealing the space between the nut and connecting part.

FIG. 1 is a broken elevational view partly in section of the improved sealing nut;

FIG. 2 is a broken elevational view partly in section showing the nut applied to a pipe end; and FIG. 3 is broken elevational view partly in section showing one manner of making a nut according to the present invention.

In FIG. 1 a sealing nut 10 is shown as comprising a nut 11 provided with an internal thread 12 and a concentric groove 13 on one side of the nut. A sealing ring 14 of elastic material is placed in the groove 13. As shown, the sealing ring 14 has a L-formed cross-section. Further a press ring 15 is placed in the groove 13 and this press ring co-operates with the sealing ring 14. The press ring 15 partly encircles the sealing ring 14 and is in the position shown in FIG. 1, only partly within the groove 13.

As shown in FIG. 1 the sealing ring 14 and the press ring 15 together have substantially a rectangular cross-section. The press ring 15 and the groove 13 are provided with protrusions 16 and 17 respectively. Thus, the press ring is movable in the groove, but cannot slide out of it.

In FIG. 2 there is shown how the presently disclosed sealing nut operates in order to obtain sealing between two threaded pipe parts.

The sealing nut 10 has been threaded onto a pipe-end 18, which is provided with a thread 19. A sleeve 20 makes a suitable connection and has been screwed onto the pipe-end 18. If the nut 10 is screwed against the pipe-sleeve 20 the press ring 15 will abut the end face of the pipe sleeve. Upon further screwing of the nut the press ring 15 is squeezed into the groove 13 and will displace the sealing ring 14. The sealing ring is squeezed into the space 21 between the thread 19 and the press ring 15 and into the threads. Upon further screwing of the nut, the sealing ring becomes compressed and fills up all of the closed space between the nut, the thread, the sleeve and the ring.

It can be seen that the press ring prevents the sealing ring from being pressed out between the sleeve and the sealing nut, even if the edge of the sleeve should be inclined. The minor diameter of the press ring is adjusted in relation to the major diameter of the thread that the sealing ring can squeeze out through the space 21 without being damaged. In one embodiment of the invention this space has a width of 1.75 mm.

As shown in FIG. 2 the sealing ring is large enough to fill up a big groove 22 at the end of the sleeve 20. This provides good sealing at very high pressure. Further, it is shown in FIG. 2 that the press ring 15 has been forced down in the nut 10 as this has been screwed. This results in the fact that the radial pressure which the sealing ring transmits to the press ring can be in turn transmitted to the nut, and thus the press ring can be made thin and the construction of the sealing nut is simplified. It is desirable that the sealing nut have a height as small as possible. One of the reasons for this is the fact that the standardized thread-ends of pipes are proportionately short. The sealing nut according to the invention occupies no more than three thread pitches.

Other advantages are realized due to the fact that the press ring in the normal position only partly encircles the sealing ring and to a large extent forces the sealing ring out of the position shown in FIG. 1 when the nut is being tightened. The compression becomes high by comparatively small axial movement of the press ring which is advantageous in view of the fact that the threads on the pipe ends are short. In the embodiment disclosed the press ring has a height of 2 mm. and when tightened the whole sealing nut is only about 8 mm. in height.

A great advantage of the sealing nut according to the invention is the fact that it can be screwed on and undone several times without harming the sealing effect.

The material of the sealing ring, of course, must be chosen in relation to the intended use of the sealing nut. For air, water, and as well as volatile heavy oils at temperatures up to 100° C., suitably a synthetic oil-resistant rubber is used. Experiments with kerosene oil, for instance, have shown that a complete and durable sealing is obtained at a pressure in the capacity of some hundred kg./cm.² At higher temperatures between 200–300° C. special compositions of silicate- or Teflon-type are used. If sealing is desired at yet higher temperatures, easily deformable metals such as lead and pure aluminum may be used. It is also possible to use a sealing ring produced of a composition of powdered metal and any fiber, for instance copper and asbestos. Even the shape of the sealing ring can, of course, be varied. When using a harder sealing material it may be suitable to provide the sealing ring with an internal thread.

In FIG. 3 a simple way is shown of producing the sealing nut shown in FIG. 2. The nut 10 and the press ring 15 have been produced as a compact unit, for instance, by casting. After the casting any desired subsequent treatment may be performed, so that it looks as shown in FIG. 3. The press ring 15 is only connected to the nut 11 by a ring-shaped plate 23 which may be about 0.3 mm. thick. Further, the groove 13 has been formed in such a way that its greatest diameter is about 0.1 mm. wider than the major diameter of the press ring 15. When the nut is in the shape shown in FIG. 3 it is suitably provided with an elastic sealing ring as shown in FIG. 1. Thereafter pressure is applied to the press ring 15 so that the press ring is sheared off from the nut 10 at the thin point 23. After this operation the sealing nut comprises three parts, namely the nut 11, the press ring 15 and the sealing ring (not shown). Since the diameters of the groove 13 and the ring 14 have been adjusted as described above the ring-shaped plate 23 has been broken off diagonally. Thus, the press ring 15 is axially and radially movable in the groove 13, but does not slide out from the groove.

Naturally, the process for producing can be varied in considerable details without departing from the original scope of the invention. Thus, it is unnecessary to produce the nut 10 and the press ring 15 as a unit. It is possible to form these parts separately and after the press ring has been attached to the nut to upset the edge of the nut so that the press ring cannot be removed.

What is claimed as new and desired to be secured by Letters Patent is:

In combination, a first pipe having outside threading thereon, a connection piece having a threaded bore with a chamfer extending from the outer surface of said connection piece to said threaded bore and at least a portion of the threaded portion of said connection piece receiving said first pipe, a nut having inside threading screwed onto said first pipe and having a surface positioned adjacent the end surface of said connection piece, a cylindrical annular recess countersunk in said surface of said nut, a press ring rupturally attached to the cylindrical side wall of said cylindrical annular recess and extending beyond said first surface of said nut and spaced axially from the base of said annular recess, said press ring having an inside diameter greater than the root diameter of said nut threading and a surface overlying the base of said annular recess inclined so that the portion of said press ring having the greater diameter is in closer proximity to said recess base, and a sealing ring of resilient material of such shape and volume so as to completely fill the space defined by said annular recess, said press ring, said end surface of said connection piece, and said threaded portion of said first pipe, said sealing ring being urged into sealing contact with all the surfaces defining the aforementioned space upon rupture of said rupturable attachment, said rupture caused by the rotation of said nut on said first pipe threads so that said press ring is brought into contact with said connection piece whereby a shearing force is produced between said nut and said rupturally attached press ring and the rupture being such that said press ring is freely movable within said annular recess but precluded from removal therefrom by the sheared portions of said press ring and said cylindrical side walls thus in turn also precluding removal of said sealing ring.

References Cited in the file of this patent

UNITED STATES PATENTS

| | | |
|---|---|---|
| 2,342,425 | Parker | Feb. 22, 1944 |
| 2,704,676 | Harding | Mar. 22, 1955 |
| 2,759,743 | Bloom | Aug. 21, 1956 |
| 2,872,961 | Mills | Feb. 10, 1959 |

FOREIGN PATENTS

| | | |
|---|---|---|
| 697,683 | Germany | Oct. 19, 1940 |